P. T. PEDERSON.
COW TIE.
APPLICATION FILED JAN. 2, 1909.

921,154.

Patented May 11, 1909.

UNITED STATES PATENT OFFICE.

PEDER T. PEDERSON, OF STAMFORD, SOUTH DAKOTA.

COW-TIE.

No. 921,154.          Specification of Letters Patent.          Patented May 11, 1909.

Application filed January 2, 1909. Serial No. 470,496.

*To all whom it may concern:*

Be it known that I, PEDER T. PEDERSON, a citizen of the United States, residing at Stamford, in the county of Stanley and State of South Dakota, have invented certain new and useful Improvements in Cow-Ties, of which the following is a specification.

This invention relates to devices used for tying or tethering animals, and especially for use to permit an animal tied thereby to have the maximum freedom when grazing.

For a full understanding of the invention, reference is to be had to the following detail description and to the accompanying drawings, in which—

Figure 1:
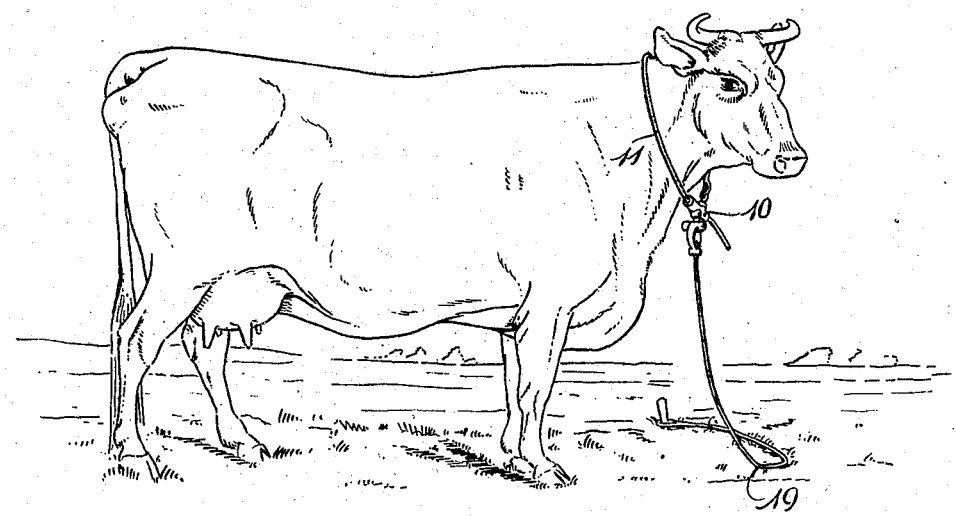
Figure 1:
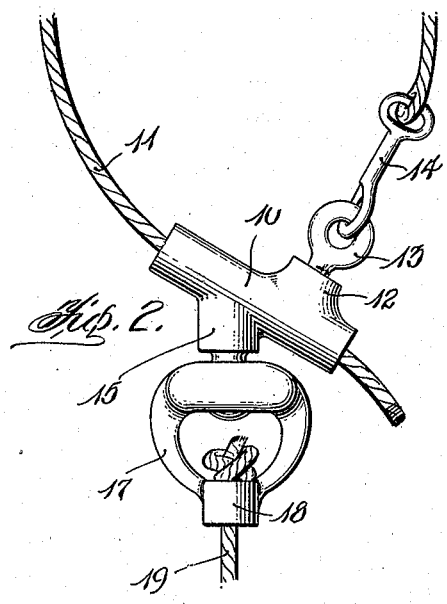
Figure 1:
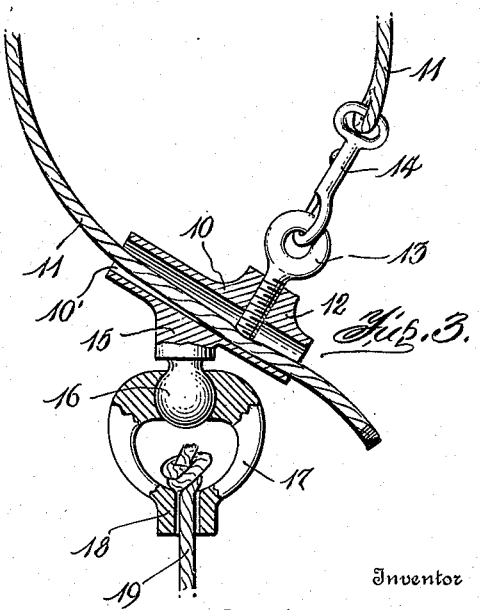

Figure 1 is a diagrammatic illustration of the invention applied in use; Fig. 2 is a side elevation of the device, portions of the ropes used in connection therewith being broken away, and Fig. 3 is a view similar to Fig. 2, but the principal parts being in section.

Throughout the following detail description and on the several figures of the drawing similar parts are referred to by like reference characters.

The invention herein set forth comprises a sleeve 10 for the reception of the adjustable end of a rope 11 to be passed around an animal's neck. The member 10 is provided on one side with a hub 12 into which is tapped a screw eye 13, the inner end of which constitutes a means for gripping the rope 11 against the opposite wall of the bore 10'. The screw-eye 13 also serves for a detachable connection of the opposite end of the rope 11, as by means of a common spring snap 14. The axis of the hub 12 is substantially at a right angle to the axis of the bore 10'.

On the opposite side of the sleeve 10 from the hub 12 is formed an integral extension 15 terminating in a ball 16, constituting one member of a ball and socket swivel. The other member 17 of said swivel is provided with a socket receiving said ball and at its opposite or lower extremity is provided with an eyelet 18 in order to facilitate attachment thereto of a grazing rope 19, adapted to be tied to any suitable stake or other support in a well known manner. The swivel 17 has permanent connection to the ball 16 but permits free rotation of the ball therein, by which means the animal secured by this device may have freedom of movement within the limits permitted by the rope 19 and yet without any danger of twisting and thereby damaging said rope 19. It will be noted that the axis of the projection 15 and ball 16 is preferably arranged at an oblique angle to the axis of the bore 10' in order that the sleeve and other devices connected therewith may better conform to the form of the animal to which the device is to be attached.

In adjusting the rope 11 around the neck of an animal the free end of the same is passed through the bore 10' and the snap end of the rope is brought around the neck and brought either to or snapped into the screw-eye 13 temporarily to determine the desired tightness for said rope. When the rope is properly adjusted as to length the screw-eye 13 will be turned tightly down upon the free end of the rope 11 clamping it in place (the snap 14 being removed from the screw-eye for this purpose if it had previously been snapped into the same). No further adjustment of the rope 11 will therefore be necessary if the device is to be used on the same animal continuously. After clamping the rope 11 as above described the device may be secured to the animal's neck by a mere manipulation of the snap 14.

Having thus described the invention, what is claimed as new, is:

The hereindescribed animal tie comprising a sleeve portion having a central bore, a threaded hub on one side and an integral projection on its opposite side terminating in a ball, a rope having its one end passed loosely through said bore, a screw-eye coöperating with the said threaded hub to clamp said rope end in place, a snap secured to the other end of said rope for coöperation with said screw-eye, a swivel yoke permanently connected to said ball, and a grazing rope secured to said swivel yoke.

In testimony whereof I affix my signature in presence of two witnesses.

PEDER T. PEDERSON.

Witnesses:
    JAS. E. GRAY,
    ISAAC SOLBERG.